United States Patent [19]

Duhaime et al.

[11] Patent Number: 5,308,427
[45] Date of Patent: May 3, 1994

[54] METHOD FOR FASTENING PLASTIC ARTICLES

[75] Inventors: Daniel M. Duhaime, Bloomfield Hills; Charles A. Dunn, Livonia; Mark R. Henault, Dearborn, all of Mich.

[73] Assignee: Ford Motor Company, Dearborn, Mich.

[21] Appl. No.: 952,088

[22] Filed: Sep. 28, 1992

[51] Int. Cl.⁵ .................. B29C 49/20; B29C 65/70
[52] U.S. Cl. ..................... 156/245; 264/516; 264/249
[58] Field of Search .......... 264/515, 516, 249, 531, 264/534, 513; 156/245, 293, 322, 309.9

[56] References Cited

U.S. PATENT DOCUMENTS

| | | | |
|---|---|---|---|
| 2,705,346 | 4/1955 | Schlabach | 264/249 |
| 3,308,225 | 3/1967 | Wells | 264/249 |
| 3,419,297 | 12/1968 | Diepenhorst et al. | 264/249 |
| 3,489,829 | 1/1970 | Lipfert | 264/516 |
| 3,595,948 | 7/1971 | Casani | 264/516 |
| 3,917,789 | 11/1975 | Heisler | 264/513 |
| 4,323,411 | 4/1982 | Uhlig . | |
| 4,342,799 | 8/1982 | Schwochert . | |
| 4,396,562 | 8/1983 | Heaume | 264/516 |
| 4,496,517 | 1/1985 | Kinoshita et al. . | |
| 4,608,744 | 9/1986 | Nemoto | 264/516 |
| 4,633,559 | 1/1987 | Loren | 264/249 |
| 4,716,931 | 1/1988 | Shibamoto . | |
| 4,719,072 | 1/1988 | Kojima et al. . | |
| 4,896,415 | 1/1990 | Bock | 264/534 |
| 4,952,347 | 8/1990 | Kasugai . | |
| 5,044,526 | 9/1991 | Sasaki et al. . | |

FOREIGN PATENT DOCUMENTS

| | | | |
|---|---|---|---|
| 61-171322 | 1/1985 | Japan . | |
| 2061800 | 5/1981 | United Kingdom | 264/516 |

*Primary Examiner*—Catherine Timm
*Attorney, Agent, or Firm*—Damian Porcari; Roger L. May

[57] ABSTRACT

A method of attaching a member to the interior of a blow-molded plastic fuel tank wall. The wall is molded from a pliable parison. An inwardly directed projection is formed integral with the wall. The projection has an inner surface and an outer surface. The outer surface forms a cavity receiving a core. The core is inserted within the cavity while the parison is partially pliable and fuzes to the wall. The projection is inserted through an aperture in the member and heated. The softened projection is squashed to secure the member to the wall.

1 Claim, 3 Drawing Sheets

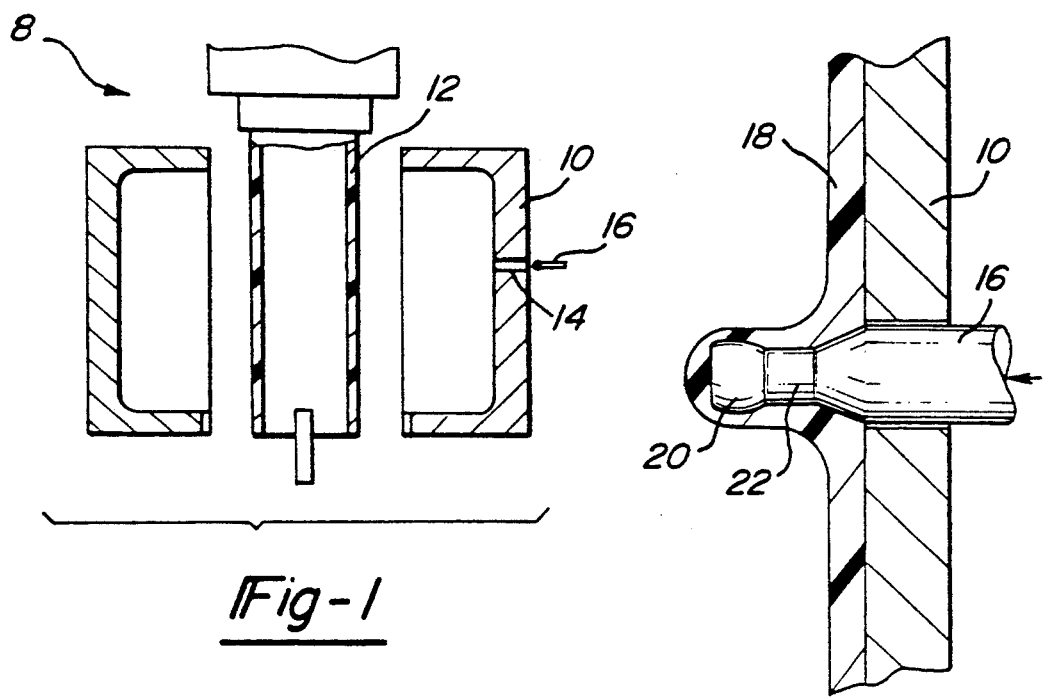
Fig-1
Fig-2
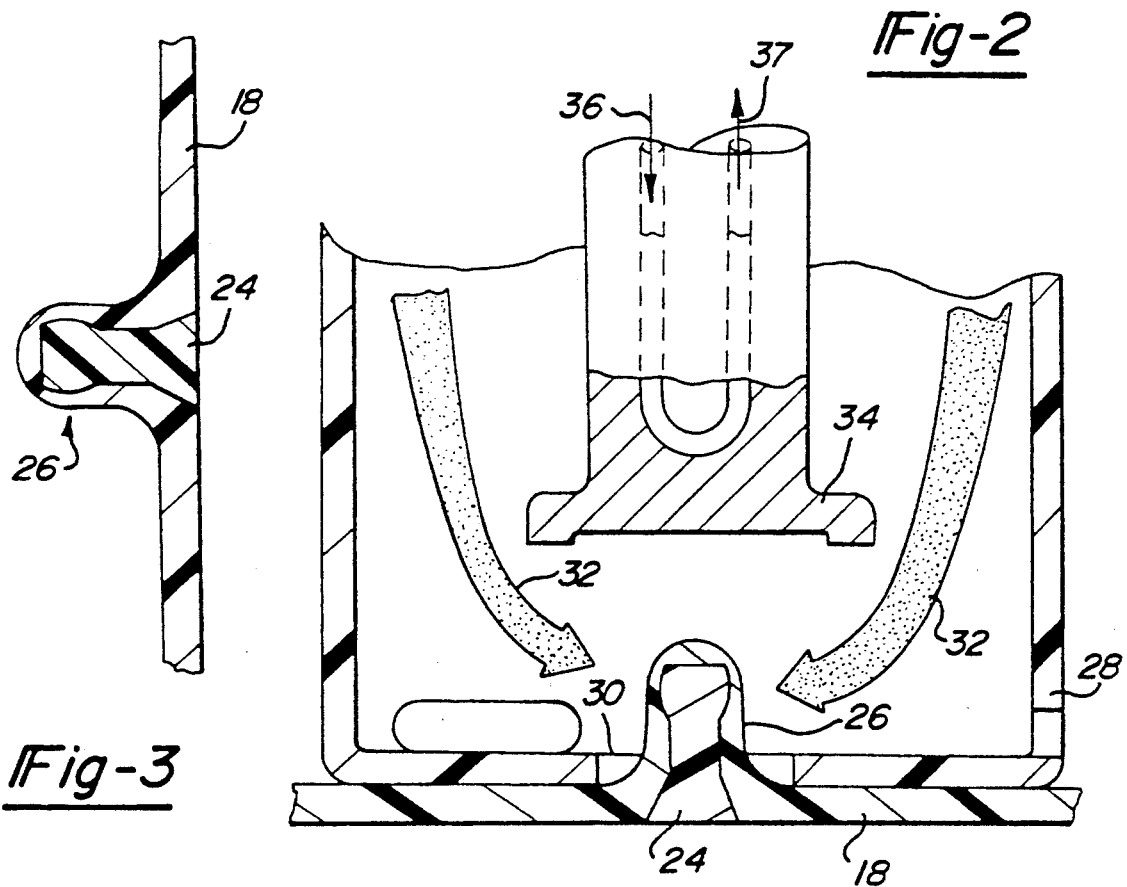
Fig-3
Fig-4

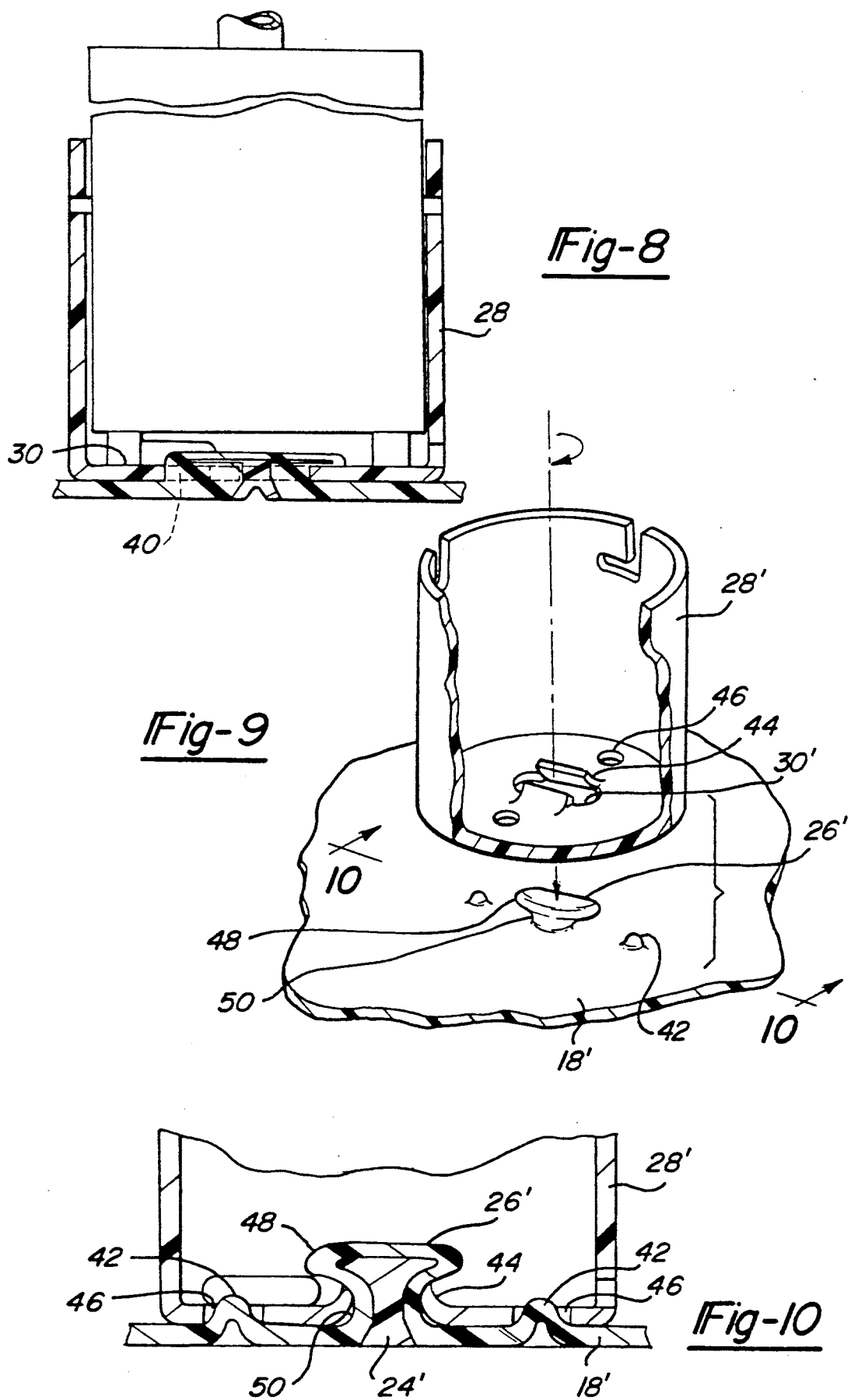

METHOD FOR FASTENING PLASTIC ARTICLES

FIELD OF THE INVENTION

The present invention relates to a method article for fastening a plastic wall to a member. More specifically, the invention relates to a method of fastening members to a blow-molded plastic wall.

BACKGROUND OF THE INVENTION

It is useful to fasten members to a plastic molded wall. Common fastening methods include bonding and welding. Mechanical fasteners are also used as exemplified by U.S. Pat. No. 5,067,575, assigned to Ford Motor Company, which teach integrally molding a socket into a blow-molded wall. A peg fastening means attaches within the socket to provide an attachment point for a member. This invention is primarily directed towards bonding items to the exterior surface of a blow-molded container. When attaching articles to the interior container, it becomes difficult to form the socket. The present invention is directed toward a method of forming an inwardly directed projection for attaching articles. This invention is especially useful in attaching articles to the interior of a blow-molded container such as a fuel tank while maintaining a leak proof structurally sound exterior wall.

SUMMARY OF THE INVENTION

The present invention relates to a method of attaching a member to a plastic wall comprising the steps of: molding the wall from a pliable parison; forming one or more inwardly directed projections in the wall, the projection being formed integral with the wall; positioning the member over the projection such that the projection extends through an aperture in the member; and securing the member to the projection.

The present invention permits the attachment of a member to a molded plastic article without the need of separate fasteners. The invention permits both a mechanical as well as a weld type attachment between the member and wall. Mechanically fastening the member to the wall permits the use of similar material for the wall and member.

In a first embodiment of the invention, an inwardly directed projection is formed in a blow-molded wall. The projection may be either hollow or filled. When the projection is filled, a core of similar or compatible material is inserted within a cavity of the projection. A member having an aperture sized to receive the projection is placed adjacent the wall and over the projection. The projection is heated to soften. The softened projection is squashed by an anvil.

In an alternative embodiment of the invention, the projection is shaped to have an enlarged head to alleviate the need for squashing the projection. The projection is formed with a head and shank, the head having a diameter greater than the shank. An aperture in the member is sized to receive the projection and permit the head to partially overlie the member. Engaging means on the member securely fastens the member to the projection. The alternative embodiment permits the attachment of a member to the interior of a blow-molded article without the need of additional manufacturing steps.

The invention provides a low cost, easily manufactured durable method of securing a member to the internal surface of a blow-molded article.

BRIEF DESCRIPTION OF THE DRAWINGS

FIG. 1 is a sectional view of a blow-molding apparatus using the present invention.

FIG. 2 is a detailed sectional view of a molding apparatus forming a projection.

FIGS. 4-8 are view illustrating the attachment of the member to the projection.

FIGS. 9 and 10 illustrate an alternative embodiment of the present invention.

DETAILED DESCRIPTION OF THE PREFERRED EMBODIMENT

Figure 5:
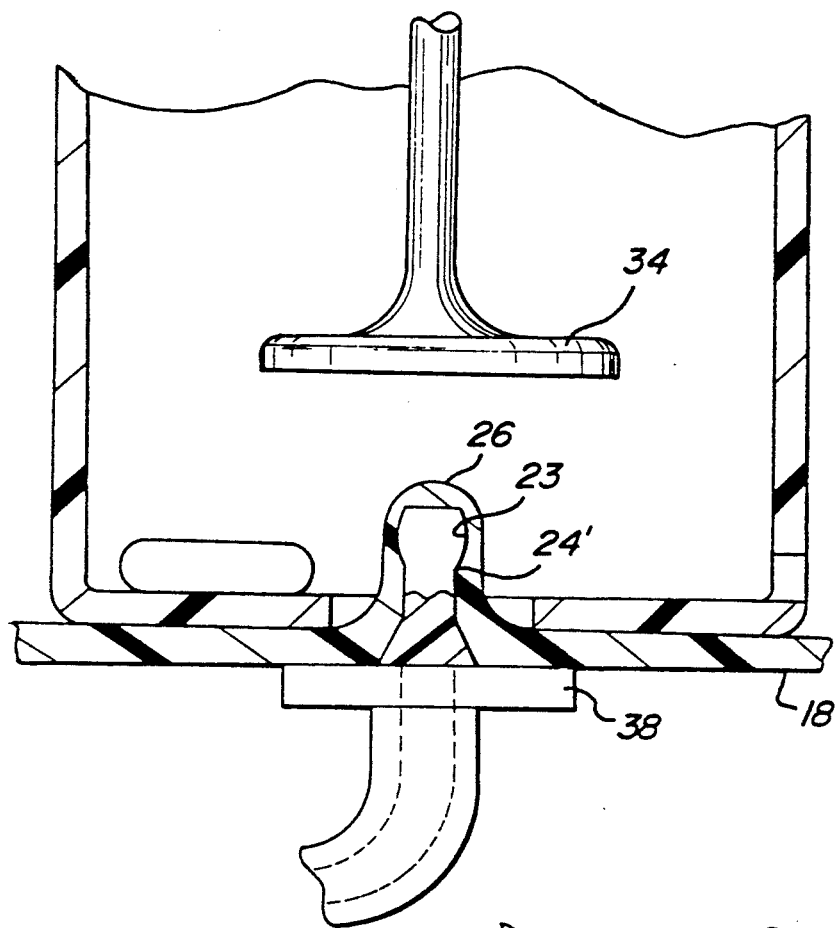

The invention relates to a method and structure for securing a member to a projection. The preferred embodiments will be described by reference to forming a projection in a blow-molded article. The projection may be formed by other means including injection molding, compression molding, stamping or vacuum forming.

Illustrated in FIG. 1 is blow-molding apparatus 8 having dies 10 forming a molded article. A tubular pliable parison 12 is extruded within apparatus 8. When the parison is inflated, it takes the shape of the interior surface of apparatus 8. Die 10 contains passage 14 communicating with the interior of apparatus 8. Rod 16 may be articulated between a retracted position and an extended position. Alternatively, rod 16 may be permanently affixed to the interior surface of die 10.

Illustrated in FIG. 2 is a detailed sectional view of apparatus 8 in the vicinity of passage 14. Rod 16 is articulated to the extended position projecting inward toward parison 12. Parison 12 is inflated and takes the shape of the interior cavity of die 10. Wall section 18 overlays and generally takes the shape of rod 16. Rod 16 contains a head portion 20 and a reduced diameter shank portion 22. The shape of rod 16 forms a socket shaped internal cavity 23 receiving core 24 as illustrated in FIG. 3. Molding parison 12 with rod 16 in an extended position assures a relatively uniform wall thickness in the vicinity of projection 26. Thinner wall thicknesses may be achieved by articulating rod 16 after wall 18 has been partially inflated.

Core 24 is preferably inserted within the internal cavity of projection 26 while parison 12 is still at least partially pliable. Core 24 is generally made from the same or compatible material as parison 12. The still hot parison 12 warms the surface of core 24 and causes it to partially melt and fuse. The use of core 24 insures that wall section 18 maintains a uniform wall thickness in the area of projectiog 26. It has also been demonstrated that with shorter length projections, strong and leak proof attachments may be provided without the use of core 24.

Member 28 is secured to projection 26 as illustrated in FIGS. 4-8. An aperture 30 in member 28 is sized to receive projection 26. Member 28 is placed atop of projection 26 and generally immediately adjacent wall 18. Hot gases 32 are directed toward projection 26 causing it to soften and partially melt. Anvil 34 presses down atop projection 26 squashing it into a deformed mushroom-shape. Projection 26 is tacky while it is in a heated state. To reduce the sticking of projection 26, anvil 34 is cooled by cool gas circulating through passages 36, 37.

When member 28 is made from a dissimilar material from projection 26, the mechanical deformation of projection 26 is the primary means which fastens member 28 to wall 18. When member 28 and projection 26 are made from the same or compatible material, heating projection 26 causes it to become tacky and weld to member 28 providing both a mechanical and a chemical bond between projection 26 and member 28.

In the alternative embodiment illustrated in FIG. 5, projection 26 may be heated by injecting a hot molten plastic material into cavity 23. Injector 38 is placed adjacent wall 18. A plastic material hot enough to partially melt projection 26 is injected within cavity 23 and forms core 24'. Projection 26 is heated internally and the external surface remains hard and does not stick to anvil 34. Because core 24' is injected in a liquid state, it need not be inserted while cavity 23 is pliable.

Figure 6:
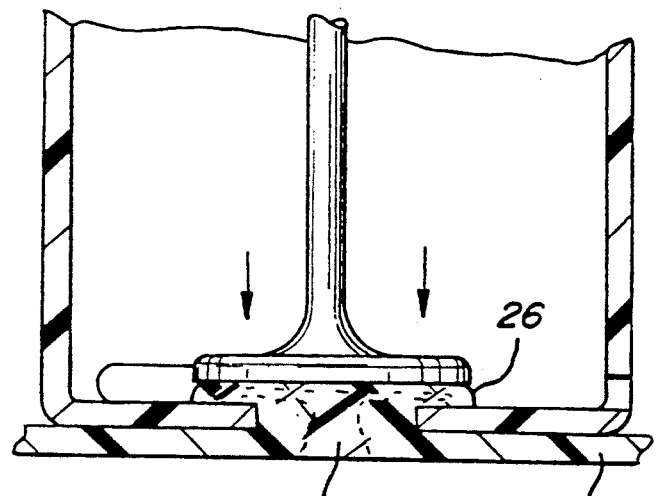
Figure 7:
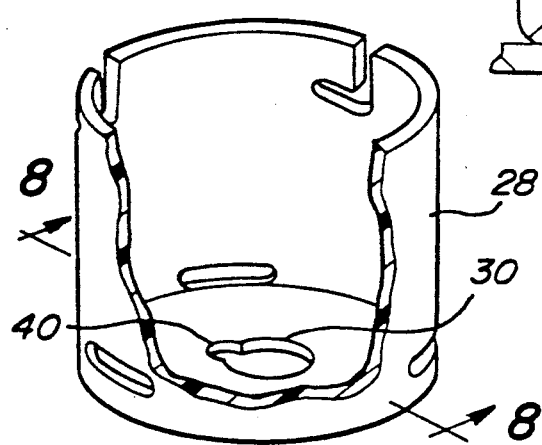

FIG. 6 illustrates the deformed shape of projection 26 after it has been squashed. When core 24, 24' is made from the same or compatible material as wall 18, then projection 26 and wall 18 become integral after squashing.

To prevent rotation of member 28 with respect to wall 18, aperture 30 is provided with a key-shaped area 40. Area 40 fills with molten material from projection 26 and holds member 28 fixed.

FIG. 8 illustrates deformed projection 26 without interior core 24, 24'. The invention may be used without a core, or with a core of the same or compatible material as wall 18. Optionally, core 24 may be inserted through die 10 during the blow-molding process in place of rod 16. Using an automatic type feeder, core 24 may be inserted within wall 18 during the blow-molding process. Individual bullet-shaped core members may be used or a length of rod can be inserted within wall 18 and cut off flush with each molding cycle.

In an alternative embodiment of the invention illustrated in FIGS. 9 and 10, projection 26' is shaped so as not to require additional forming by an anvil. Projection 26' is formed to have an enlarged head 48 and a reduced diameter shank 50. Projection 26' is preferably formed by inserting core member 24' slightly smaller but similarly shaped to projection 26' within a mold. As the parison inflates, the walls overlay core 24' to form the shape illustrated in FIG. 9. Alternatively, projection 26' may be formed by a rod having an oval shape head portion (not shown). Projection 26' may be either filled with a core or left hollow. Inwardly directed stops 42 may be formed within wall 18' in a similar fashion. Member 28' has an oval-shaped aperture 30' sized to receive projection 26'. Optionally, upward extending flaps 44 engage projection 26 and restrain member 28' from vertical movement. Member 28' is overlaid atop wall 18' with projection 26' aligning with aperture 30'. Member 28' is rotated so that head 48 overlies flaps 44 as shown in FIG. 10. Flaps 44 prevent vertical movement of member 28' with respect to wall 18'. Stops 42 engage apertures 46 to restrict rotational movement of member 28'. Member 28' may be removed from wall 18' by the application of rotational force sufficient to depress stops 42.

The invention has been described and illustrated as a method and structure for attaching a cup to the interior surface of a blow-molded container. Other modifications and variations of the present design are possible without departing from the spirit and scope of the invention as claimed.

What is claimed:

1. A method of attaching a member to the interior of a blow-molded plastic fuel tank wall comprising the steps of:

molding said wall from a pliable parison;

forming one or more inwardly directed projection in said wall, said projection being formed integral with said wall, said projection having an inner surface and an outer surface, said outer surface forming a cavity receiving a core;

inserting said core within said cavity while said parison is partially pliable, said core fusing to said outer surface of said wall;

inserting said projection through an aperture in said member;

heating said projection and causing said projection to soften; and squashing said projection over said aperture and securing said member to said inner surface of said projection.

* * * * *